(12) United States Patent
Kaneko et al.

(10) Patent No.: US 7,251,556 B2
(45) Date of Patent: Jul. 31, 2007

(54) KNOCK DETERMINATION DEVICE FOR INTERNAL COMBUSTION ENGINE

(75) Inventors: Rihito Kaneko, Nishikamo-gun (JP); Kenji Kasashima, Nishikamo-gun (JP); Kenji Senda, Okazaki (JP); Shigeru Kamio, Nagoya (JP); Masaomi Inoue, Kariya (JP); Yuichi Takemura, Anjo (JP)

(73) Assignees: Toyota Jidosha Kabushiki Kaisha, Toyota-shi (JP); DENSO Corporation, Kariya-shi (JP)

( * ) Notice: Subject to any disclaimer, the term of this patent is extended or adjusted under 35 U.S.C. 154(b) by 0 days.

(21) Appl. No.: 11/312,735

(22) Filed: Dec. 21, 2005

(65) Prior Publication Data
US 2006/0136117 A1   Jun. 22, 2006

(30) Foreign Application Priority Data
Dec. 22, 2004   (JP)   ............................... 2004-371898

(51) Int. Cl.
  *B60T 7/12*   (2006.01)
  *F02P 5/00*   (2006.01)
(52) U.S. Cl. .................. 701/111; 123/406.37; 73/35.09
(58) Field of Classification Search ................ 701/111, 701/114, 115; 123/406.37, 406.29, 435; 73/35.09
See application file for complete search history.

(56) References Cited

U.S. PATENT DOCUMENTS

| 2004/0162668 | A1 | 8/2004 | Rawlinson et al. |
| 2006/0129303 | A1 | 6/2006 | Sauler et al. |
| 2006/0136117 | A1* | 6/2006 | Kaneko et al. ............. 701/111 |
| 2006/0185422 | A1* | 8/2006 | Iwade et al. ............... 73/35.09 |
| 2006/0243030 | A1* | 11/2006 | Oe et al. .................... 73/35.09 |
| 2006/0288981 | A1* | 12/2006 | Kaneko et al. ........ 123/406.37 |
| 2007/0012090 | A1* | 1/2007 | Yoshihara et al. ......... 73/35.09 |

FOREIGN PATENT DOCUMENTS

| DE | 103 00 204.9 | 1/2003 |
| DE | 10215959 | 10/2003 |
| EP | 0732573 | 9/1996 |
| EP | 0889309 | 1/1999 |
| EP | 1 221 603 A1 | 7/2002 |
| FR | 2765623 | 1/1999 |
| GB | 2 245 382 A | 1/1992 |
| JP | 63-001761 | 1/1988 |
| JP | 04-076249 | 3/1992 |
| JP | 06-249047 | 9/1994 |

(Continued)

*Primary Examiner*—John T. Kwon
(74) *Attorney, Agent, or Firm*—Kenyon & Kenyon LLP

(57) ABSTRACT

An engine ECU executes a program including a step of calculating coefficient of correlation K that is a value related to a deviation between a vibration waveform and a knock waveform model by comparing the engine's vibration waveform with the knock waveform model stored in advance at a plurality of timings, a step of calculating a knock intensity N as based on a largest coefficient of correlation K among the calculated coefficient of correlation Ks, a step of determining that the engine knocks if knock intensity N is larger than a predetermined reference value (YES at S108), and a step of determining that the engine does not knock if knock intensity N is not larger than a predetermined reference value (NO at S108).

8 Claims, 9 Drawing Sheets

FOREIGN PATENT DOCUMENTS

| | | |
|---|---|---|
| JP | 2000-205098 | 7/2000 |
| JP | 2001-173508 | 6/2001 |
| JP | 2001-227400 | 8/2001 |
| JP | 2002-357156 | 12/2002 |
| JP | 2003-021032 | 1/2003 |
| JP | 2003-172196 | 6/2003 |
| JP | 2003-278592 | 10/2003 |
| JP | 2004-353531 | 12/2004 |

* cited by examiner

KNOCK DETERMINATION DEVICE FOR INTERNAL COMBUSTION ENGINE

This nonprovisional application is based on Japanese Patent Application No. 2004-371898 filed with the Japan Patent Office on Dec. 22, 2004, the entire contents of which are hereby incorporated by reference.

BACKGROUND OF THE INVENTION

1. Field of the Invention

The present invention relates to a knock determination device and particularly to a knock determination device for an internal combustion engine that determines based on a waveform of vibration of an internal combustion engine whether the engine knocks.

2. Description of the Background Art

Conventionally, a technique for detecting knocking of an internal combustion engine is known. Japanese Patent Laying-Open No. 2001-227400 discloses a knock control device for an internal combustion engine that can accurately determine whether the engine knocks. The knock control device for an internal combustion engine disclosed in Japanese Patent Laying-Open No. 2001-227400 includes a signal detector detecting a signal representing a waveform of vibration occurring in an internal combustion engine(or a vibration waveform signal), a occurrence period detector detecting a period as an occurrence period during which the vibration waveform signal detected by the signal detector takes on a value of at least a predetermined value, a peak position detector detecting a peak position in the occurrence period detected by the occurrence period detector, a knock determiner determining whether the internal combustion engine knocks based on the relationship between the occurrence period and the peak position, and a knock controller controlling an operation state of the internal combustion engine in accordance with a determination result of the knock determiner. The knock determiner determines knock (knocking) occurs when the peak position relative to the occurrence period is in a predetermined range.

According to the knock control device for an internal combustion engine disclosed in the publication, a signal representing a waveform of vibration occurring in an internal combustion engine is detected by a signal detector. An occurrence period during which the vibration waveform signal takes on a value of at least a predetermined value and a peak position therein are detected by an occurrence period detector and a peak position detector, respectively. Thus, the knock determiner is allowed to determine whether the engine knocks by detecting the position of the peak in the occurrence period of the vibration waveform signal. According to the knock determination result, the operation state of the internal combustion engine is controlled. When the peak position relative to the occurrence period is in a predetermined range, that is, when a waveform is shown in such a shape that the peak position appears earlier relative to a predetermined length of the occurrence period of the vibration waveform signal, the knock determiner recognizes it as being particular to knocking. Thus, even in a transition state where an operation state of the internal combustion engine abruptly changes or when electric loads are turned on/off, whether or not the internal combustion engine knocks is accurately determined, and the operation state of the internal combustion engine can be controlled appropriately.

However, while the engine knocks, a vibration that is greater in magnitude than a vibration attributed to knocking may sometimes be detected as noise. That is, in some cases a vibration attributed to a fault of a knock sensor or attributed to a vibration of the internal combustion engine itself may be greater in magnitude than a vibration attributed to knocking. In such cases, with the knock control device for an internal combustion engine of Japanese Patent Laying-Open No. 2001-227400, there has been a problem that the engine is erroneously determined as not knocking while the engine actually knocks, based on the fact that the peak position relative to the occurrence period is not within a predetermined range.

SUMMARY OF THE INVENTION

An object of the present invention is to provide a knock determination device that can determine whether the engine knocks with high precision.

A knock determination device for an internal combustion engine according to one aspect of the present invention includes: a crank angle detector detecting a crank angle of the internal combustion engine; a waveform detector detecting a waveform of vibration of the internal combustion engine at predetermined crank angle intervals; a storage storing in advance a waveform of vibration of the internal combustion engine; and a determiner determining whether the internal combustion engine knocks, as based on a result of comparing the detected waveform with the stored waveform at a plurality of timings.

According to the present invention, a knock waveform model corresponding to a waveform of vibration caused when the engine knocks can be created for example in an experiment and stored in advance, and the model and a detected waveform can be compared at a plurality of timings to determine whether the engine knocks. Thus, when vibration occurs at a plurality of timings at predetermined crank angle intervals, whether the vibration at each timing is attributed to knocking can be analyzed in detail. Thus, whether the engine knocks can be determined with high precision. As a result, a knock determination device that can determine whether the engine knocks with high precision can be provided.

A knock determination device for an internal combustion engine according to another aspect of the present invention includes: a crank angle detector detecting a crank angle of the internal combustion engine; a waveform detector detecting a waveform of vibration of the internal combustion engine at predetermined crank angle intervals; a storage storing in advance a waveform of vibration of the internal combustion engine; and a determiner determining whether the internal combustion engine knocks, as based on a result of comparing the detected waveform with the stored waveform at timings where a magnitude of vibration decreases in the detected waveform.

According to the present invention, a knock waveform model corresponding to a waveform of vibration caused when the engine knocks can be created for example in an experiment and stored in advance, and the model and a detected waveform can be compared at a plurality of timings to determine whether the engine knocks. Thus, when vibration occurs at a plurality of timings at predetermined crank angle intervals, whether the vibration at each timing is attributed to knocking can be analyzed in detail. Thus, whether the engine knocks can be determined with high precision. As a result, a knock determination device that can determine whether the engine knocks with high precision can be provided.

Preferably, the knock determination device further includes a calculator calculating a value related to a deviation between the detected waveform and the stored waveform. The determiner determines whether the internal combustion engine knocks, as based on the value related to the deviation at a timing that provides a minimum deviation between the detected waveform and the stored waveform.

According to the present invention, a difference between the detected waveform and the stored waveform is represented numerically as a value related to deviation. Thus, the detected waveform can be numerically analyzed to objectively determine whether the engine knocks. Additionally, whether the engine knocks is determined as based on, among calculated values related to the deviation, the value related to the deviation at a timing that provides the minimum deviation between the detected waveform and the stored waveform. Thus, whether the engine knocks can be determined as based on the waveform that is highly possibly a waveform of vibration attributed to knocking. Accordingly, whether the engine knocks can be determined with high precision.

Further preferably, the knock determination device further includes a calculator calculating a value related to a deviation between the detected waveform and the stored waveform; and a magnitude detector detecting a magnitude of vibration of the internal combustion engine. The waveform detector detects a waveform of vibration of the internal combustion engine based on the magnitude of vibration. The determiner determines that the internal combustion engine knocks, as based on the value related to the deviation and the magnitude of vibration at a timing that provides a minimum deviation between the detected waveform and the stored waveform.

According to the present invention, a difference between the detected waveform and the stored waveform is represented numerically as a value related to deviation. Thus, the detected waveform can be numerically analyzed to objectively determine whether the engine knocks. Additionally, whether the engine knocks is determined as based on the value related to deviation and the largest value of magnitude of vibration at a timing that provides the minimum deviation between the detected waveform and the stored waveform. Thus, whether the engine knocks can be determined as based on the waveform that is highly possibly a waveform of vibration attributed to knocking and the magnitude of vibration with that waveform. Accordingly, whether the engine knocks can be determined with high precision.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter with reference to the drawings the present invention in embodiments will be described. In the following description, identical components are identically denoted and also identical in name and function. Therefore, detailed description thereof will not be repeated.

First Embodiment

Figure 1:
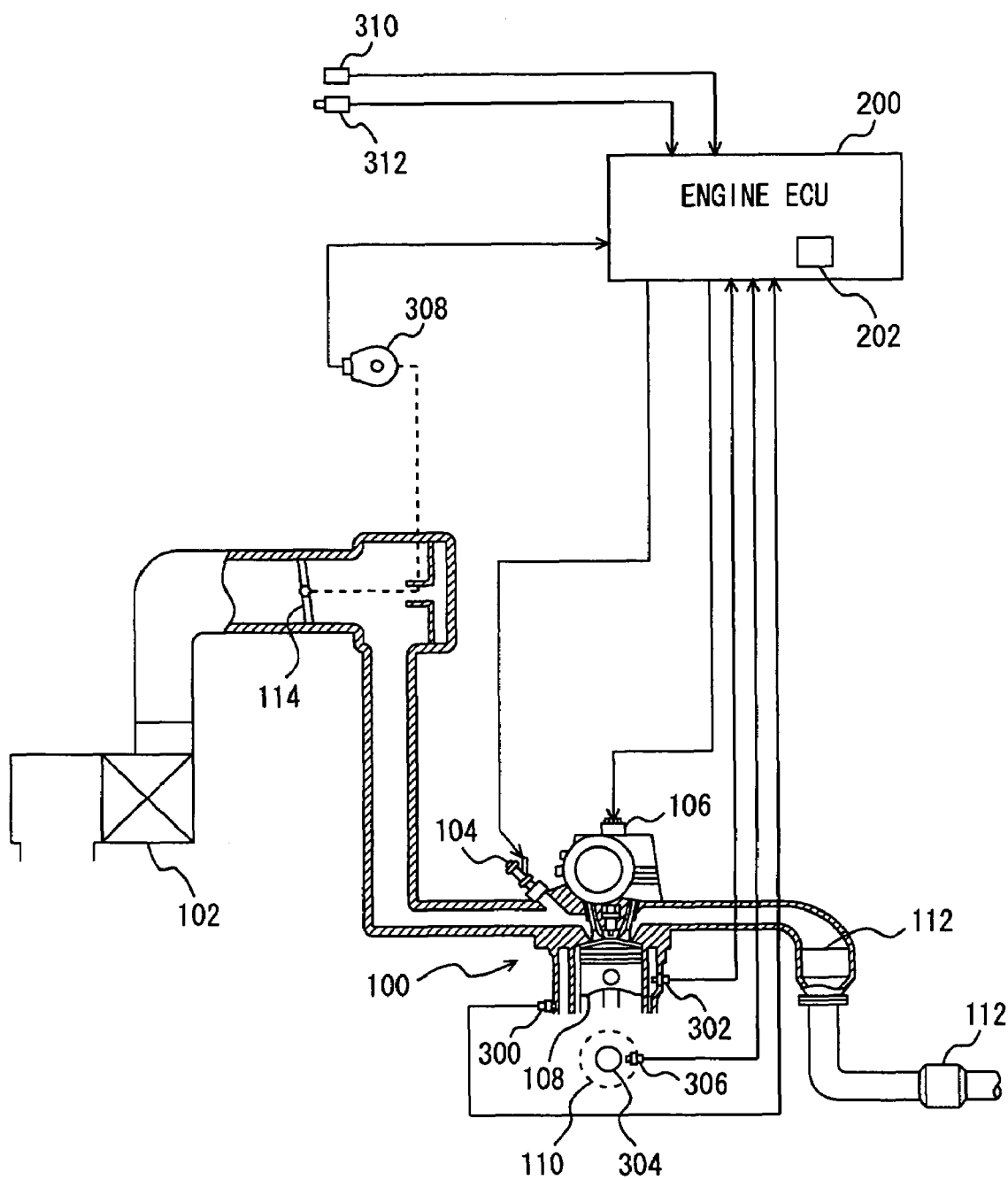
FIG. 1 is a schematic configuration diagram showing an engine controlled by a knock determination device according to a first embodiment of the present invention.

With reference to FIG. 1, an engine 100 of a vehicle incorporating a knock determination device according to the first embodiment of the present invention will be described. The knock determination device according to the present embodiment is implemented by a program executed by an engine ECU (Electronic Control Unit) 200, for example.

Engine 100 is an internal combustion engine that allows a mixture of air aspirated through an air cleaner 102 and a fuel injected by an injector 104 to be ignited in a combustion chamber by a spark plug 106 and thus combusted.

The air-fuel mixture combusted causes combustion pressure which presses a piston 108 down and a crank shaft 110 rotates. The combusted air-fuel mixture (or exhaust gas) is purified by a three-way catalyst 112 and thereafter discharged outside the vehicle. Engine 110 aspirates an amount of air adjusted by a throttle valve 114.

Engine 100 is controlled by engine ECU 200 having connected thereto a knock sensor 300, a water temperature sensor 302, a crank position sensor 306 arranged opposite a timing rotor 304, a throttle opening sensor 308, a vehicle speed sensor 310, and an ignition switch 312.

Knock sensor 300 is implemented by a piezoelectric element. As engine 100 vibrates, knock sensor 300 generates a voltage having a magnitude corresponding to that of the vibration. Knock sensor 300 transmits a signal representing the voltage to engine ECU 200. Water temperature sensor 302 detects temperature of refrigerant water in engine 100 at a water jacket and transmits a signal representing a resultant detection to engine ECU 200.

Timing rotor 304 is provided at a crank shaft 110 and rotates as crank shaft 110 does. Timing rotor 304 is circumferentially provided with a plurality of protrusions spaced as predetermined. Crank position sensor 306 is arranged opposite the protrusions of timing rotor 304. When timing rotor 304 rotates, an air gap between the protrusions of timing rotor 304 and crank position sensor 306 varies, and a coil portion of crank position sensor 306 passes an increased/decreased magnetic flux and thus experiences electromotive force. Crank position sensor 306 transmits a signal representing the electromotive force to engine ECU 200. From the signal, engine ECU 200 detects a crank angle.

Throttle opening sensor 308 detects a throttle opening and transmits a signal representing a resultant detection to engine ECU 200. Vehicle speed sensor 310 detects a rate of rotation of a wheel (not shown) and transmits a signal representing a resultant detection to engine ECU 200. From the wheel's rate of rotation engine ECU 200 calculates the vehicle's speed. Ignition switch 312 is turned on by a driver starting engine 100.

Engine ECU 200 uses the signals transmitted from each sensor and ignition switch 312 and a map and program stored in a memory 202 to perform an arithmetic operation to control equipment so that engine 100 has a desired driving condition.

In the present embodiment engine ECU 200 depends on a signal transmitted from knock sensor 300 and a crank angle to detect a waveform of vibration of engine 100 at a predetermined knock detection gate (a section from a predetermined first crank angle to a predetermined second crank angle) (hereinafter such waveform of vibration will also simply be referred to as "vibration waveform") and from the detected vibration waveform determines whether engine 100 knocks. The knock detection gate of the present embodiment is from the top dead center (0°) to 90° in a combustion process. It is noted that the knock detection gate is not limited thereto.

Figure 2:
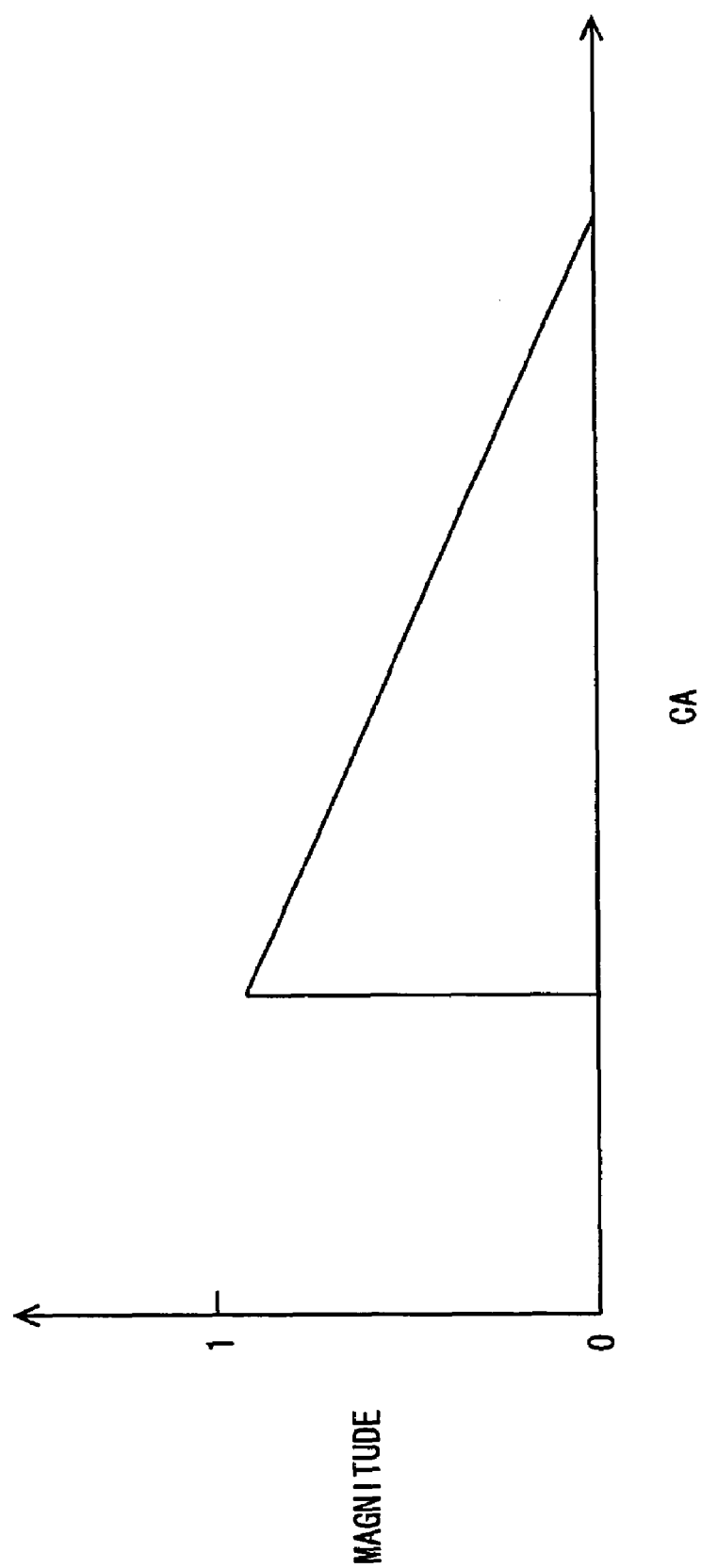
FIG. 2 is a diagram representing a knock waveform model (1) stored in a memory of an engine ECU in the knock determination device according to the first embodiment of the present invention.

To determine whether the engine knocks, memory 202 of engine ECU 200 stores a knock waveform model corresponding to a model of a waveform of vibration caused when engine 100 knocks, as shown in FIG. 2.

In the knock waveform model, a vibration's magnitude is represented by a dimensionless number of 0 to 1 and does not uniquely correspond to a crank angle. More specifically, for the present embodiment's knock waveform model, while it is determined that the vibration decreases in magnitude as the crank angle increases after a vibration's peak value in magnitude, the crank angle at which the vibration has the peak value in magnitude is not determined. Furthermore, the knock waveform model is a wave of a composition of vibration of frequency bands. In FIG. 2, CA represents a crank angle.

Figure 3:
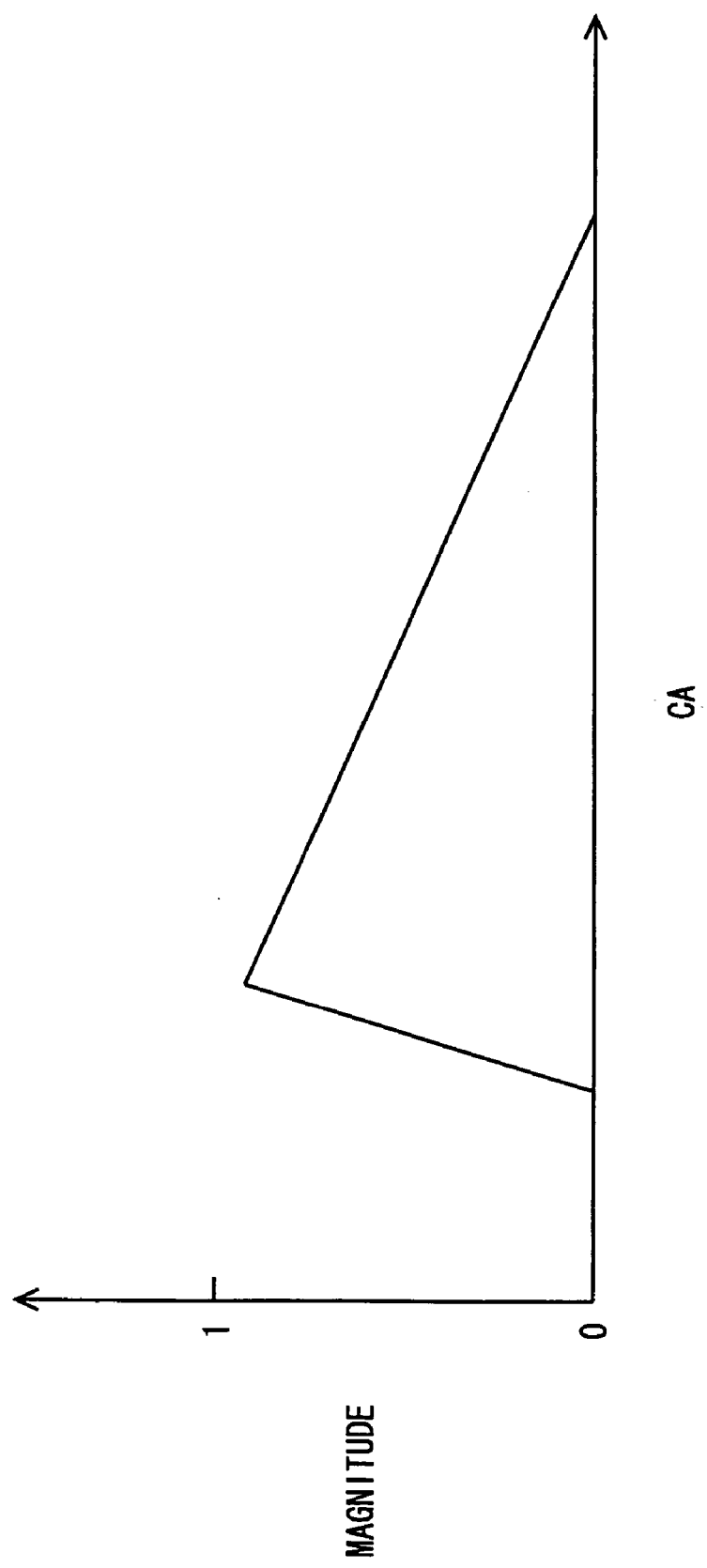
FIG. 3 is a diagram representing a knock waveform model (2) stored in a memory of an engine ECU in the knock determination device according to the first embodiment of the present invention.

The present embodiment's knock waveform model corresponds to a vibration caused by knocking following the peak value in magnitude of the vibration. It should be noted that, as shown in FIG. 3, a knock waveform model corresponding to a vibration attributed to knocking following the rise of the vibration may be stored.

The knock waveform model is obtained as follows: an experiment or the like is conducted to cause engine 100 to knock to detect the engine 100 vibration waveform, from which the knock waveform model is created and stored in advance. It should be noted, however, that the models may be created by a different method. Engine ECU 200 compares a detected waveform with the stored knock waveform model to determine whether engine 100 knocks.

Figure 4:
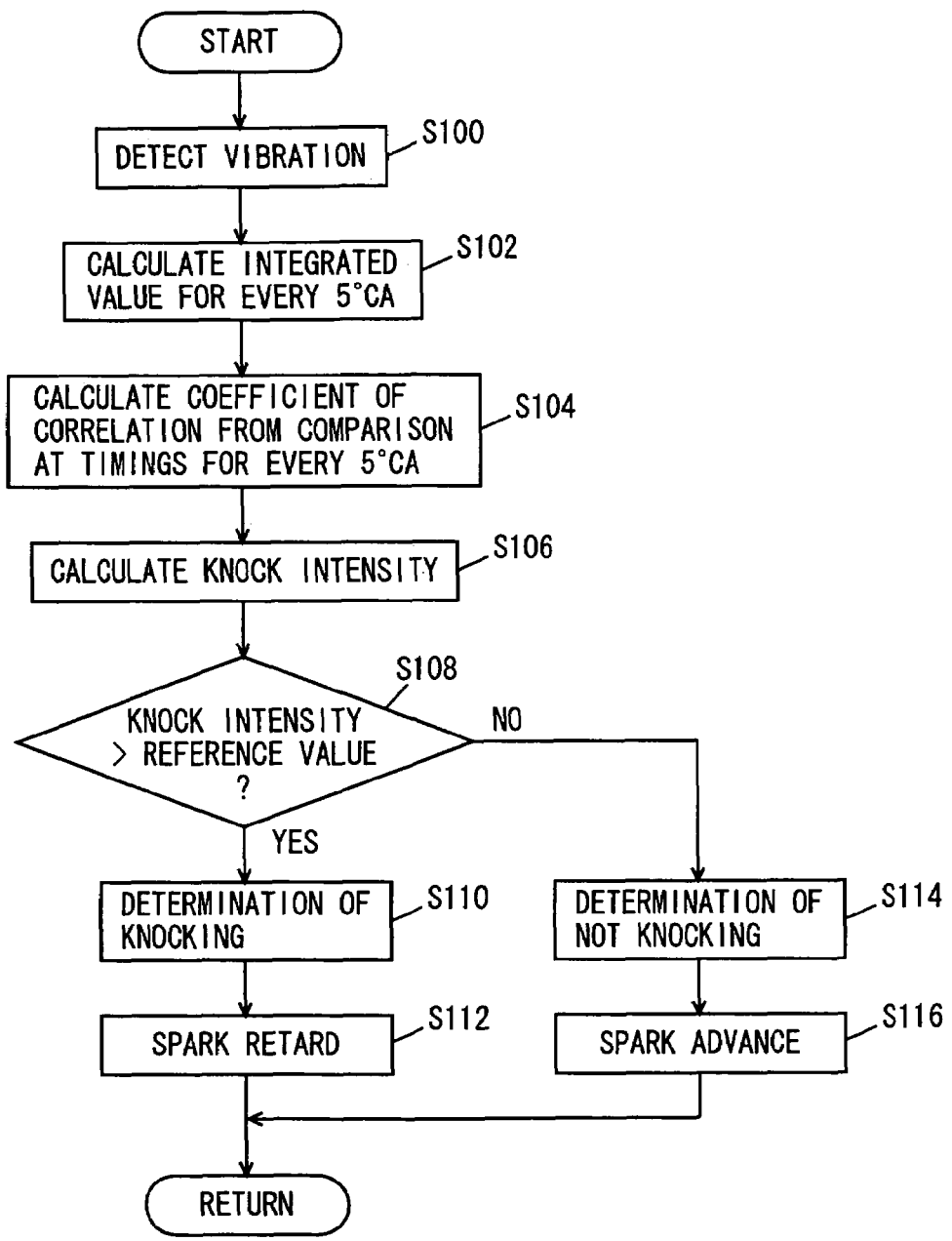
FIG. 4 is a flowchart for illustrating a control structure of a program executed by the engine ECU in the knock determination device according to the first embodiment of the present invention.

With reference to FIG. 4, a control structure of a program executed by engine ECU 200 in the present embodiment's knock determination device will be described hereinafter.

At step (hereinafter simply referred to as "S") 100 engine ECU 200 detects the magnitude of engine 100 vibration from a signal transmitted from knock sensor 300. The vibration's magnitude is represented by a value of voltage output from knock sensor 300. Note that the vibration's magnitude may be represented by a value corresponding to the value of the voltage output from knock sensor 300. The vibration's magnitude is detected in a combustion process for an angle from a top dead center to (a crank angle of) 90°.

At S102 engine ECU 200 calculates for a crank angle of every five degrees an integration (hereinafter also be referred to as an "integrated value") of values of voltage output from knock sensor 300 (i.e., representing magnitude of vibration). The integrated value is calculated for each frequency band's vibration, and then the integrated values of respective frequency bands are composited together. Thus a vibration waveform of engine 100 is detected.

Figure 5:
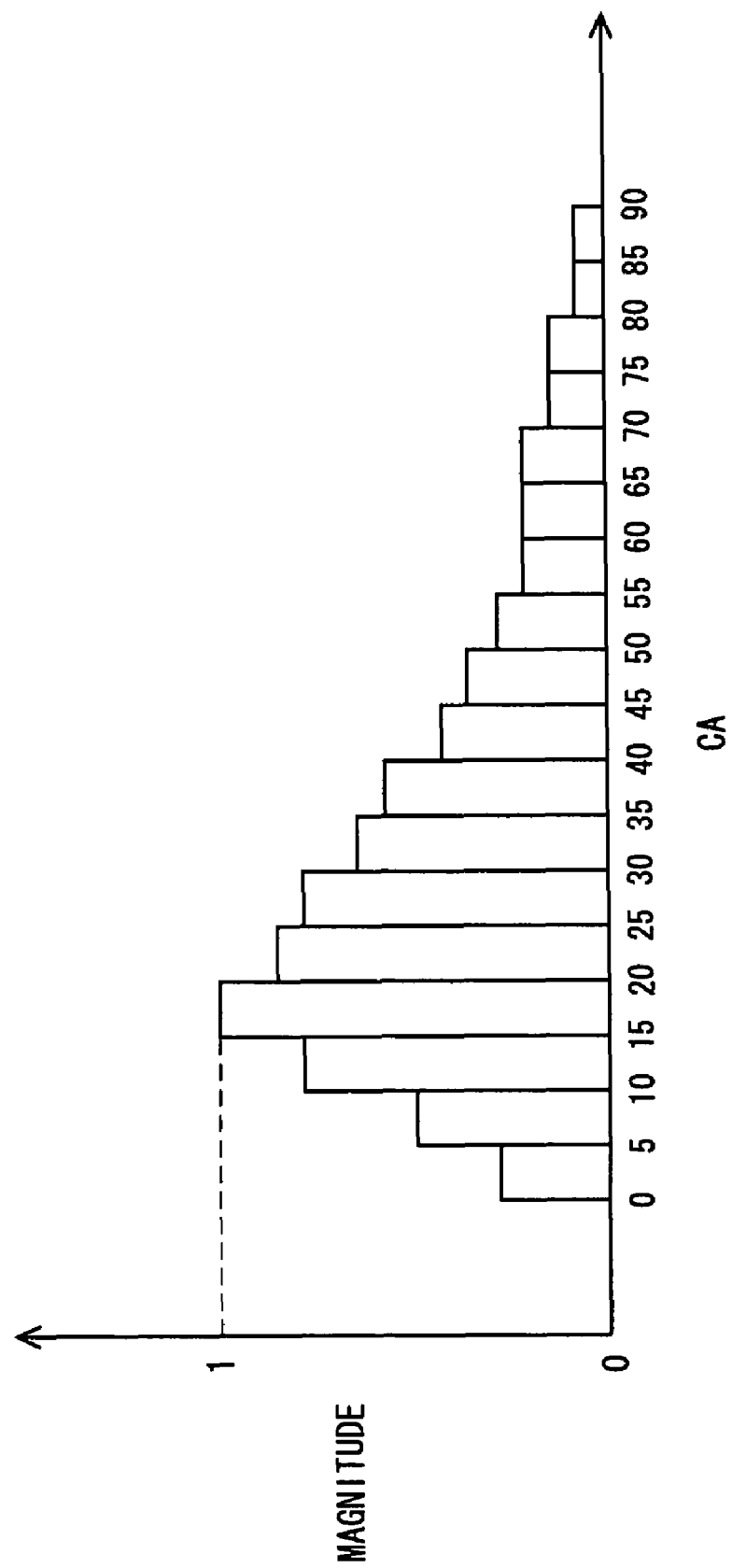
FIG. 5 is a diagram representing a vibration waveform after normalization.

At S104 engine ECU 200 compares the vibration waveform and the knock waveform model at a plurality of timings shifted by five degrees each, to calculate a coefficient of correlation K that is a value related to a deviation between the vibration waveform and the knock waveform model. The vibration waveform is normalized before compared with the knock waveform model. Herein, normalizing a waveform means dividing each integrated value by the largest of the integrated values at crank angles where the vibration waveform and the knock waveform model overlap, so that the vibration's magnitude is represented by a dimensionless number of 0 to 1, as shown in FIG. 5.

The deviation in absolute value (or an amount of offset) between the vibration waveform normalized at each timing and the knock waveform model is calculated for each crank angle (of five degrees) to calculate the coefficient of correlation K. If the normalized vibration waveform and the knock waveform model provide a deviation ΔS (I) (wherein I is a natural number) in absolute value for each crank angle and the knock waveform model's vibration as represented in magnitude integrated by the crank angle (i.e., the knock waveform model's area) is represented by S, then the coefficient of correlation K is calculated by an equation K=(S−ΣΔS (I))/S, wherein ΣΔS (I) represents a sum of ΔS (I)s for a crank angle where the vibration waveform and the knock waveform model overlap. Note that the coefficient of correlation K may be calculated by a different method.

Referring back to FIG. 4, at S106 engine ECU 200 calculates a knock intensity N. Knock intensity N is calculated based on the largest of the calculated coefficient of correlation Ks and a largest integrated value P, i.e., the largest of the integrated values at a timing that provides the largest coefficient of correlation K. If engine 100 does not knock and vibrates with a magnitude represented in value by a background level (BGL), then knock intensity N is calculated by an equation N=P×K/BGL. The BGL is stored in memory 202. Note that knock intensity N may be calculated by a different method.

At S108 engine ECU 200 determines whether knock intensity N is larger than a predetermined reference value. If so (YES at S108) the control proceeds with S110, otherwise (NO at S108) the control proceeds with S114.

At S110 engine ECU 200 determines that engine 100 knocks. At S112 engine ECU 200 introduces a spark retard. At S114 engine ECU 200 determines that engine 100 does not knock. At S116 engine ECU 200 introduces a spark advance.

An operation of engine ECU 200 of the knock determination device according to the present embodiment based on the above-described configuration and flowchart will be described.

When a driver turns on ignition switch 312 and engine 100 starts, the engine 100 vibration is detected in magnitude from a signal transmitted from knock sensor 300 (S100).

In a combustion process for a range from the top dead center to 90° an integrated value for every five degrees is calculated for each frequency and integrated values calculated for the frequencies are composited together (S102). Thus, as shown in FIG. 6, the engine 100 vibration waveform is detected.

Using an integrated value for every five degrees to detect a vibration waveform allows minimized detection of a waveform of vibration having a complicated form attributed to a vibration having a magnitude varying minutely. This can help to compare a detected vibration waveform with a knock waveform model.

Herein, it is assumed that an integrated value for 15°–20° is calculated as a peak value in magnitude of a vibration attributed to knocking, while an integrated value for 50°–55° is calculated as a peak value in magnitude of a vibration not attributed to knocking (noise). Additionally, the peak value of the vibration not attributed to knocking is greater than the peak value of the magnitude of the vibration attributed to knocking.

Figure 6:
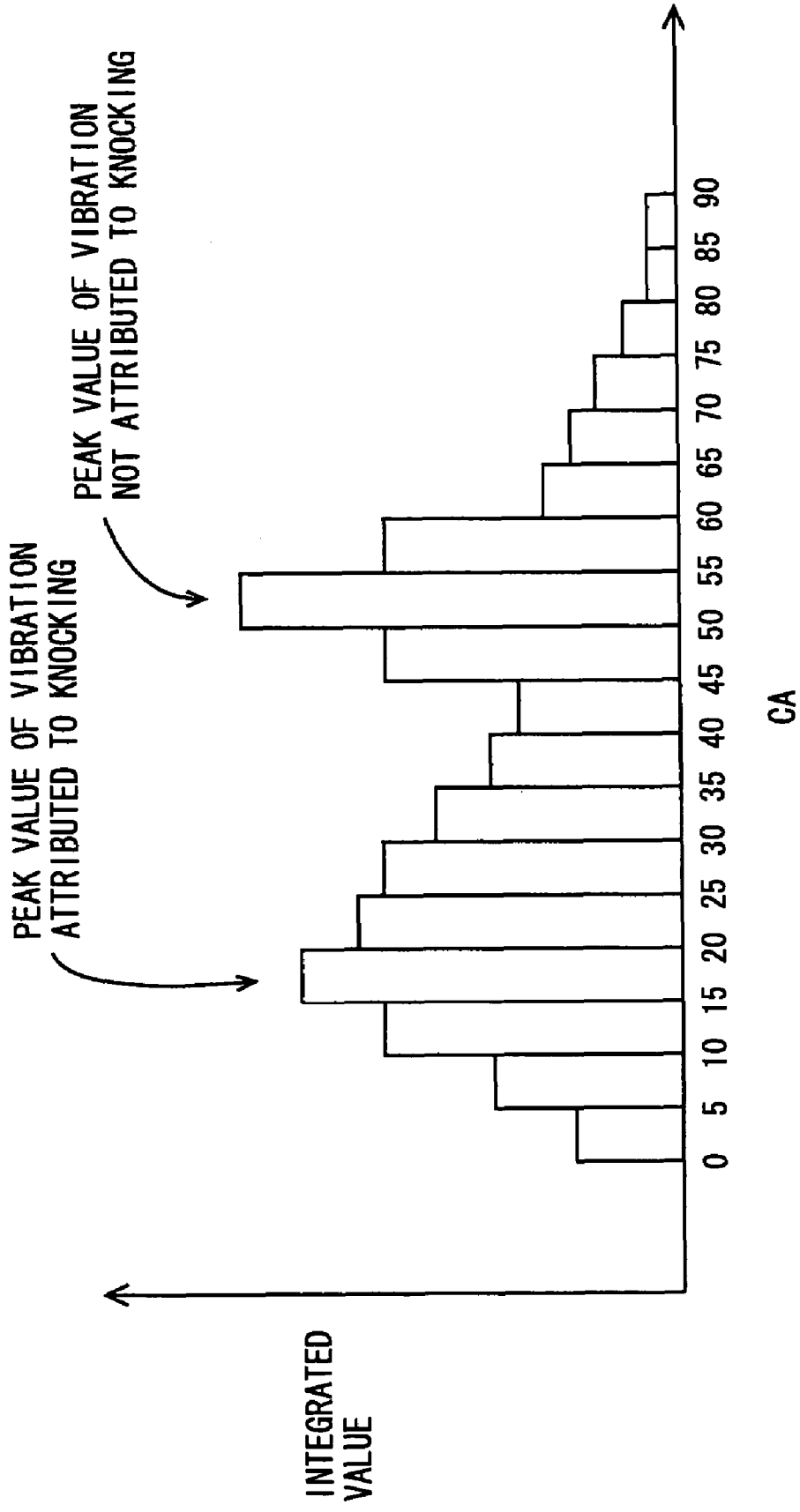
FIG. 6 is a diagram representing a vibration waveform before normalization.

Note that while FIG. 6 represents a vibration waveform in a rectangle, each integrated value may be connected by a line to represent the vibration waveform. Furthermore, each integrated value alone may be represented in a dot to represent the vibration waveform.

Figure 7:
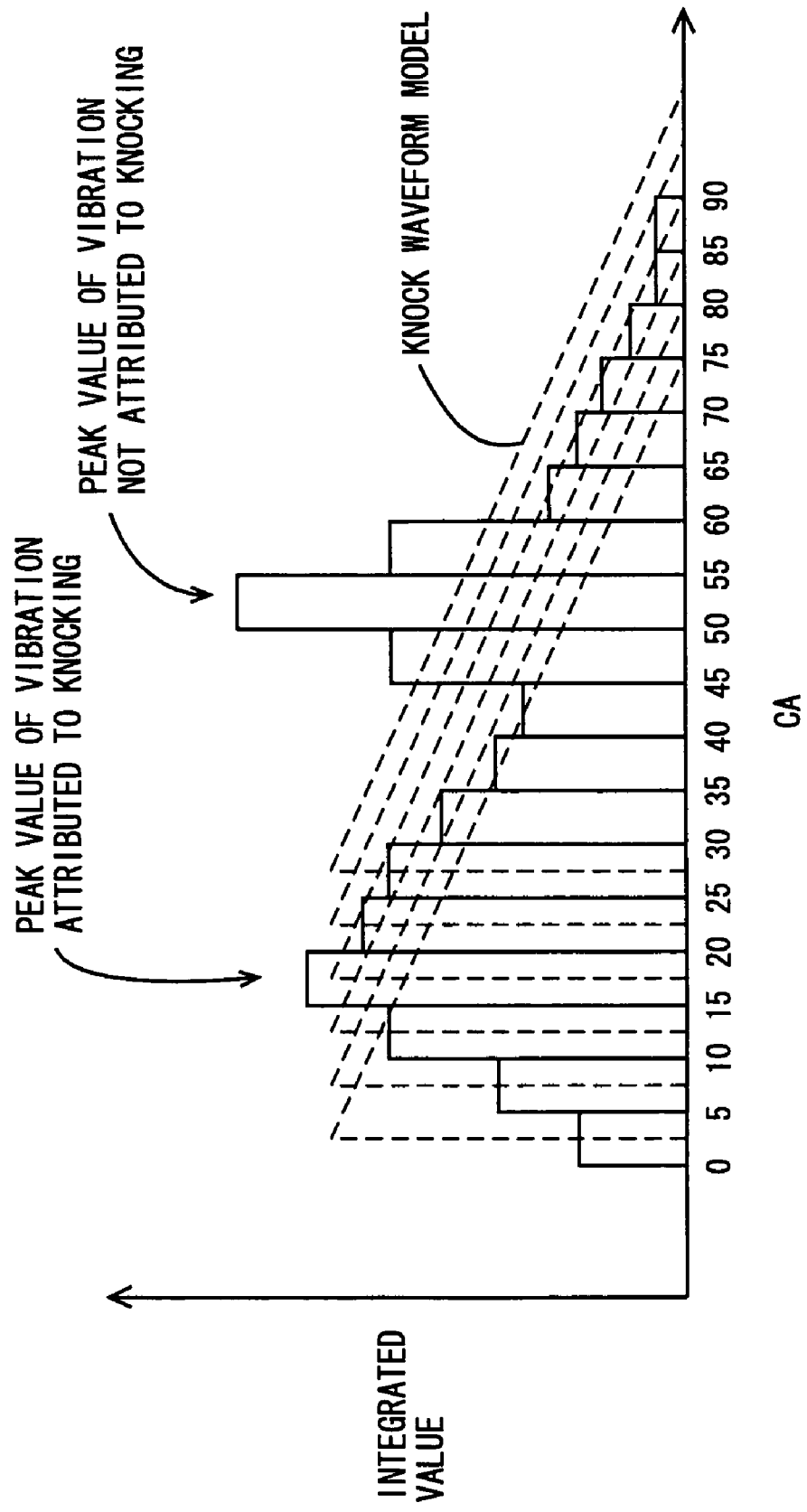
FIG. 7 is a diagram representing timings for comparing an engine's vibration waveform with a knock waveform model in the knock determination device according to the first embodiment of the present invention.

As shown in FIG. 7, the detected vibration waveform is compared with the knock waveform model (dashed line) at a plurality of timings shifted by five degrees each. At each timing, a deviation in absolute value $\Delta S$ (I) of the normalized vibration waveform and the knock waveform model is calculated for each crank angle. Sum $\Sigma \Delta S$ (I) of such $\Delta S$ (I)s and value S representing a magnitude of vibration in knock waveform model that is integrated by crank angle are used to calculate the coefficient of correlation $K=(S-\Sigma \Delta S\ (I))/S$ (S104). This allows a degree of matching of a detected vibration waveform and a knock waveform model to be numerically represented and thus objectively determined.

While in FIG. 7 the vibration waveform before normalization is compared with the knock waveform model (dashed line), actually the normalized vibration waveform is compared with the knock waveform model. Specifically, by dividing each integrated value by the largest of the integrated values at a crank angle where the vibration waveform and the knock waveform model overlap, the vibration waveform is normalized, and comparison between the normalized vibration waveform and the knock waveform model is conducted at each timing shifted by five degrees. Additionally, the knock waveform model shown by dashed line in FIG. 7 corresponds to part of timings at which comparison with the vibration waveform is conducted.

By this normalization of the vibration waveform, regardless of the magnitude of vibration at each timing, the vibration waveform can be analyzed for every timing using one knock waveform model. This can eliminate the necessity of storing a large number of knock waveform models corresponding to the magnitude of vibration and thus help to create a knock waveform model.

After coefficient of correlation K is calculated, the product of coefficient of correlation K and the largest integrated value P is divided by the BGL to calculate knock intensity N (S106). Thus, in addition to the degree of matching between the detected vibration waveform and the knock waveform model, vibration's magnitude can also be depended on to analyze in more detail whether the engine 100 vibration is attributed to knocking.

Coefficient of correlation K used in calculating knock intensity N is the largest of the calculated coefficient of correlation Ks. That is, using coefficient of correlation K calculated at the timing that provides the minimum deviation between the vibration waveform and the knock waveform model, knock intensity N is calculated.

Largest integrated value P used in calculating knock intensity N is the largest of the integrated values at a timing at which the largest coefficient of correlation K is calculated. That is, it is the largest of the integrated values at a timing providing the minimum deviation between the vibration waveform and the knock waveform model and at crank angles where the vibration waveform and the knock waveform model overlap. Thus, a vibration waveform that is highly possibly a waveform of vibration attributed to knocking as well as vibration's magnitude can be depended on to determine whether the engine 100 knocks.

Herein, it is assumed that coefficient of correlation K is the largest when it is calculated at a timing where a peak value in magnitude of vibration of the knock waveform model and the integrated value for 15°–20° are matched. At this timing, the vibration waveform and the knock waveform model overlap at crank angles of 15°–90°, and therefore the integrated value for 50°–55° is employed for the largest integrated value P used for calculating knock intensity N.

If calculated knock intensity N is larger than a predetermined reference value (YES at S108) a determination is made that engine knocks (S110) and a spark retard is introduced (S112) to prevent the engine from knocking.

If knock intensity N is not larger than the predetermined reference value (NO at S108), a determination is made that the engine does not knock (S114) and a spark advance is introduced (S116).

Thus, in the present embodiment's knock determination device, the engine ECU detects the engine's vibration waveform based on a signal transmitted from a knock sensor and compares the vibration waveform with the knock vibration model at a plurality of timings to calculate coefficient of correlation K. The product of the largest coefficient of correlation K among the calculated coefficient of correlation Ks, i.e., coefficient of correlation K calculated at a timing at which deviation between the vibration waveform and the knock waveform model is the smallest, and the largest integrated value P at that timing is divided by the BGL to calculate knock intensity N. If knock intensity N is larger than a reference value, a determination is made that the engine knocks. If knock intensity N is not larger than the reference value, a determination is made that the engine does not knock. Thus, when vibration that is not attributed to knocking is detected except for the vibration attributed to knocking, vibration at each timing can be analyzed to determine whether the engine knocks. This can prevent erroneous determination that the engine does not knock when it actually does, which would be invited by analyzing only the vibrations not attributed to knocking. Thus, whether the engine knocks or not can be determined with high precision.

Second Embodiment

Figure 8:
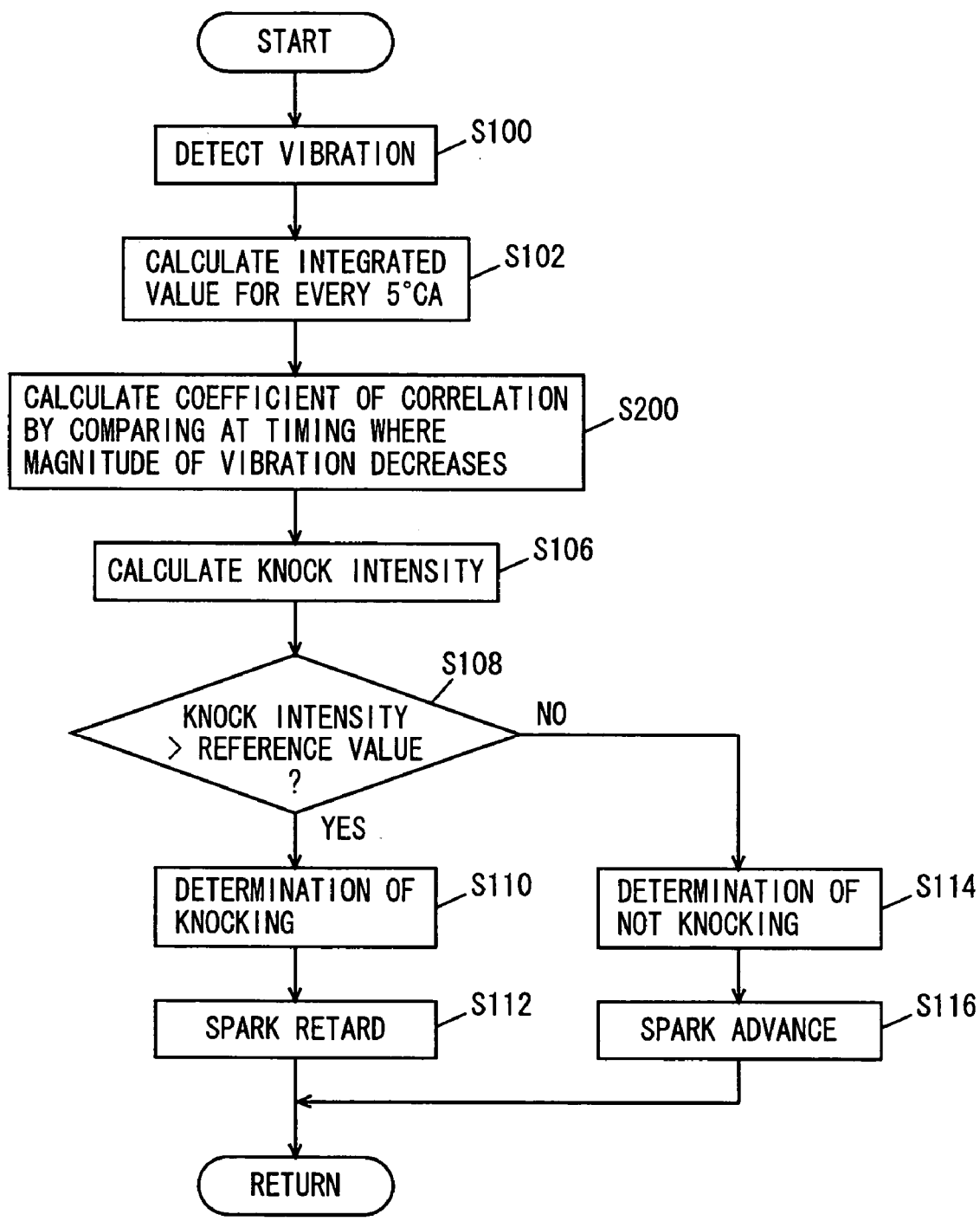
FIG. 8 is a flowchart for illustrating a control structure of a program executed by an engine ECU in a knock determination device according to a second embodiment of the present invention.
Figure 9:
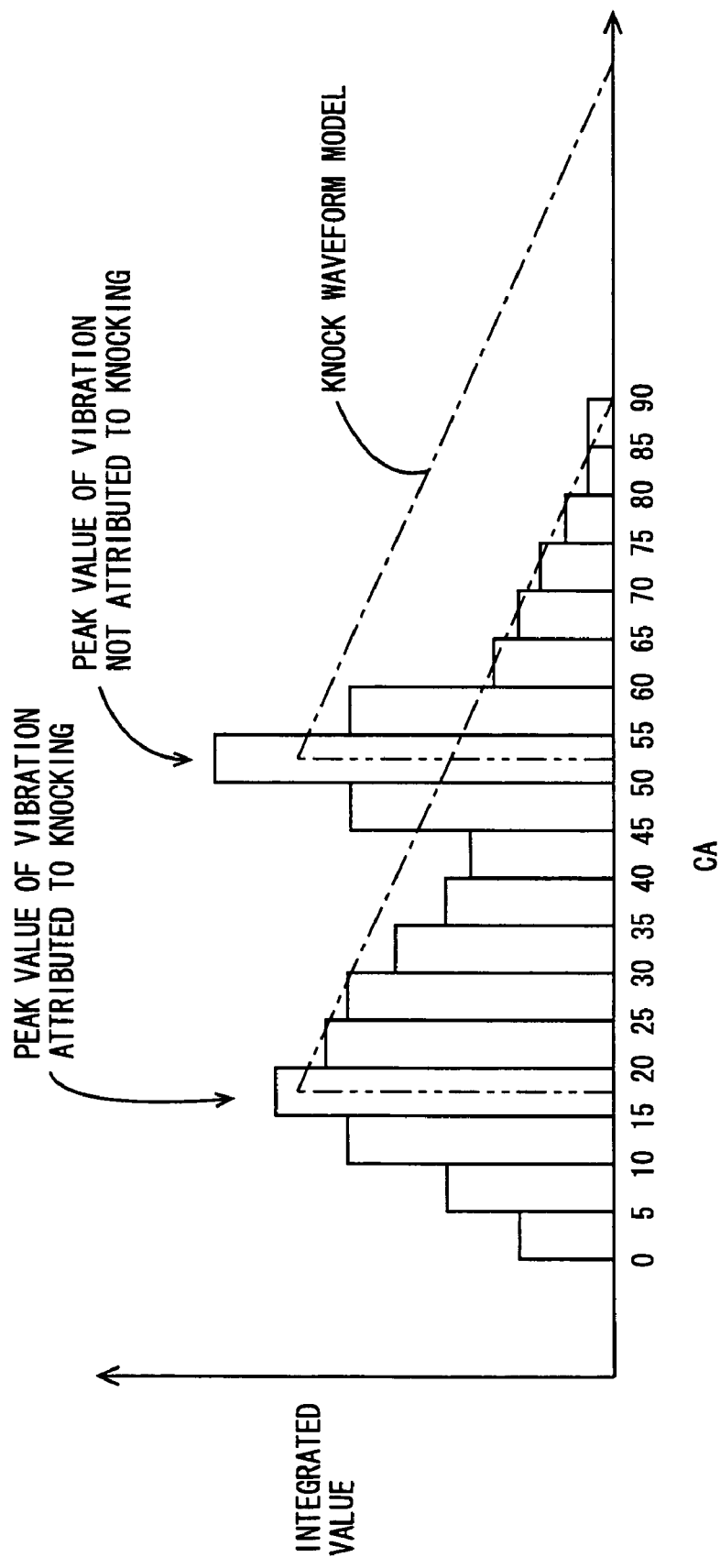
FIG. 9 represents timings for comparing an engine's vibration waveform and a knock waveform model in the knock determination device according to the second embodiment of the present invention.

Referring to FIGS. 8 and 9, a second embodiment of the present invention will be described. In the foregoing first embodiment, the vibration waveform is compared with the knock waveform model at a plurality of timings shifted by five degrees. In contrast, in the present embodiment, the vibration waveform is compared with the knock waveform model at timings where vibration decreases in magnitude in the vibration waveform. The rest of the configuration is the same as in the foregoing first embodiment. The functions thereof are also the same. Accordingly, detailed description thereof will not be repeated.

Referring to FIG. 8, the control structure of a program executed by engine ECU 200 of a knock determination device according to the present embodiment will be described. The same processes as in the foregoing first embodiment are denoted by the same reference step numbers, and detailed description thereof will not be repeated.

At S200, engine ECU 200 compares the vibration waveform with the knock waveform model at a timing where the intensity of vibration decreases in the vibration waveform to calculate a coefficient of correlation K. Here, the vibration waveform is normalized before compared with the knock waveform model.

The operation of engine ECU 200 of the knock determination device according to the present embodiment based on the above-described structure will be described.

When a driver turns on ignition switch 312 and engine 100 starts, the engine 100 vibration is detected in magnitude from a signal transmitted from knock sensor 300 (S100).

In a combustion process for a range from the top dead center to 90° an integrated value for every five degrees is calculated for each frequency and integrated values calculated for the frequencies are composited together (S102). Thus, the engine 100 vibration waveform is detected.

Herein, as in the foregoing first embodiment, it is assumed that an integrated value for 15°–20° is a peak value in magnitude of a vibration attributed to knock, while an integrated value for 50°–55° is a peak value in magnitude of a vibration not attributed to knock. Additionally, the integrated value for 50°–55° is larger than the integrated value for 15°–20°.

As shown in FIG. 9, the detected vibration waveform is compared with the knock waveform model (alternate-short-and-long dashed line) at timings where the intensity of vibration (integrated value) decreases in the vibration waveform. At each timing, a deviation in absolute value ΔS (I) of the normalized vibration waveform and the knock waveform model is calculated for each crank angle. Sum ΣΔS (I) of such ΔS (I)s and value S representing a magnitude of vibration in knock waveform model that is integrated by crank angle are used to calculate the coefficient of correlation K=(S−ΣΔS (I))/S (S200).

While in FIG. 9 the vibration waveform before normalization is compared with the knock waveform model (alternate-short-and-long dashed line), actually the normalized vibration waveform is compared with the knock waveform model as in the first embodiment. Specifically, by dividing each integrated value by the largest integrated value at the crank angles where the vibration waveform and the knock waveform model overlap, the vibration waveform is normalized, and the normalized vibration waveform is compared with the knock waveform model.

After coefficient of correlation K is calculated, the product of coefficient of correlation K and the largest integrated value P is divided by the BGL to calculate knock intensity N (S106). Coefficient of correlation K used in calculating knock intensity N is the largest of the calculated coefficient of correlation Ks. That is, using coefficient of correlation K calculated at the timing that provides the minimum deviation between the vibration waveform and the knock waveform model, knock intensity N is calculated.

Largest integrated value P used in calculating knock intensity N is the largest integrated value P at a timing at which the largest coefficient of correlation K is calculated. That is, it is the largest integrated value P at a timing providing the minimum deviation between the vibration waveform and the knock waveform model and at crank angles where the vibration waveform and the knock waveform model overlap.

Herein, it is assumed that coefficient of correlation K is the largest when it is calculated at a timing where a peak value in magnitude of vibration of the knock waveform model and the integrated value for 15°–20° are matched. At this timing, the vibration waveform and the knock waveform model overlap at crank angles of 15°–90°, and therefore the integrated value for 50°–55° is employed for the largest integrated value P used for calculating knock intensity N.

If calculated knock intensity N is larger than a predetermined reference value (YES at S108) a determination is made that engine knocks (S110) and a spark retard is introduced (S112) to prevent the engine from knocking.

If knock intensity N is not larger than the predetermined reference value (NO at S108), a determination is made that the engine does not knock (S114) and a spark advance is introduced (S116).

Thus, in the present embodiment's knock determination device, the engine ECU detects the engine's vibration waveform based on a signal transmitted from a knock sensor and compares the vibration waveform with the knock vibration model at timings where the magnitude of vibration decreases to calculate coefficient of correlation K. The product of the largest of the calculated coefficient of correlation Ks, i.e., coefficient of correlation K calculated at a timing at which deviation between the vibration waveform and the knock waveform model is the smallest, and the largest integrated value P at that timing is divided by the BGL to calculate knock intensity N. If knock intensity N is larger than a reference value, a determination is made that the engine knocks. If knock intensity N is not larger than the reference value, a determination is made that the engine does not knock. Thus, the effect similar to that in the first embodiment can be attained, and also the timings for calculating coefficient of correlation K can be reduced as compared to the first embodiment. Therefore, the burden of engine ECU can be alleviated and whether or not engine knocks can quickly be determined.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A knock determination device for an internal combustion engine, comprising:
   a crank angle detector detecting a crank angle of said internal combustion engine;
   a waveform detector detecting a waveform of vibration of said internal combustion engine at predetermined crank angle intervals;
   a storage storing in advance a waveform of vibration of said internal combustion engine; and
   a determiner determining whether said internal combustion engine knocks, as based on a result of comparing the detected waveform with the stored waveform at a plurality of timings.

2. A knock determination device for an internal combustion engine, comprising:
   a crank angle detector detecting a crank angle of said internal combustion engine;

a waveform detector detecting a waveform of vibration of said internal combustion engine at predetermined crank angle intervals;

a storage storing in advance a waveform of vibration of said internal combustion engine; and a determiner determining whether said internal combustion engine knocks, as based on a result of comparing the detected waveform with the stored waveform at timings where a magnitude of vibration decreases in the detected waveform.

3. The knock determination device for an internal combustion engine according to claim 1, further comprising a calculator calculating a value related to a deviation between the detected waveform and the stored waveform, wherein said determiner determines whether said internal combustion engine knocks, as based on said value related to the deviation at a timing that provides a minimum deviation between the detected waveform and the stored waveform.

4. The knock determination device for an internal combustion engine according to claim 1, further comprising:

a calculator calculating a value related to a deviation between the detected waveform and the stored waveform; and a magnitude detector detecting a magnitude of vibration of said internal combustion engine, wherein said waveform detector detects a waveform of vibration of said internal combustion engine based on said magnitude of vibration, and said determiner determines that said internal combustion engine knocks, as based on said value related to the deviation and said magnitude of vibration at a timing that provides a minimum deviation between the detected waveform and the stored waveform.

5. A knock determination device for an internal combustion engine, comprising:

crank angle detecting means for detecting a crank angle of said internal combustion engine;

waveform detecting means for detecting a waveform of vibration of said internal combustion engine at predetermined crank angle intervals;

storing means for storing in advance a waveform of vibration of said internal combustion engine; and determining means for determining whether said internal combustion engine knocks, as based on a result of comparing the detected waveform with the stored waveform at a plurality of timings.

6. A knock determination device for an internal combustion engine, comprising:

crank angle detecting means for detecting a crank angle of said internal combustion engine;

waveform detecting means for detecting a waveform of vibration of said internal combustion engine at predetermined crank angle intervals;

storing means for storing in advance a waveform of vibration of said internal combustion engine; and determining means for determining whether said internal combustion engine knocks, as based on a result of comparing the detected waveform with the stored waveform at timings where a magnitude of vibration decreases in the detected waveform.

7. The knock determination device for an internal combustion engine according to claim 5, further comprising means for calculating a value related to a deviation between the detected waveform and the stored waveform, wherein said determining means includes means for determining whether said internal combustion engine knocks, as based on said value related to the deviation at a timing that provides a minimum deviation between the detected waveform and the stored waveform.

8. The knock determination device for an internal combustion engine according to claim 5, further comprising:

means for calculating a value related to a deviation between the detected waveform and the stored waveform; and means for detecting a magnitude of vibration of said internal combustion engine, wherein said waveform detecting means includes means for detecting a waveform of vibration of said internal combustion engine based on said magnitude of vibration, and said determining means includes means for determining that said internal combustion engine knocks, as based on said value related to the deviation and said magnitude of vibration at a timing that provides a minimum deviation between the detected waveform and the stored waveform.

* * * * *